United States Patent [19]

Uhlig

[11] 3,944,642

[45] *Mar. 16, 1976

[54] METHOD FOR BLOW MOLDING PLASTIC ARTICLES

[75] Inventor: Albert R. Uhlig, Toledo, Ohio

[73] Assignee: Owens-Illinois, Inc., Toledo, Ohio

[ * ] Notice: The portion of the term of this patent subsequent to Dec. 25, 1990, has been disclaimed.

[22] Filed: Jan. 26, 1973

[21] Appl. No.: 326,926

Related U.S. Application Data

[62] Division of Ser. No. 143,802, May 17, 1971, Pat. No. 3,740,181.

[52] U.S. Cl. .................... 264/89; 264/97; 264/98; 264/296
[51] Int. Cl.² ........................................ B29C 17/07
[58] Field of Search ............ 264/89, 94, 96, 97, 98, 264/99, 294, 296; 425/326 B, 387 B, 242 B, DIG. 205, 211, 215

[56] References Cited
UNITED STATES PATENTS

| 2,715,751 | 8/1955 | Weber | 264/97 |
| 2,966,702 | 1/1961 | Soubier | 264/97 |
| 3,012,286 | 12/1961 | Gasmire | 264/97 |
| 3,052,916 | 9/1962 | Campbell | 264/97 |
| 3,399,424 | 9/1968 | Sheptak | 264/94 X |
| 3,579,622 | 5/1971 | Shaw et al. | 264/99 |
| 3,718,724 | 2/1973 | Holzmann et al. | 264/98 |
| 3,781,395 | 12/1973 | Uhlig | 264/98 X |

FOREIGN PATENTS OR APPLICATIONS 1,147,118  4/1969  United Kingdom ........ 425/DIG. 215

Primary Examiner—Jan H. Silbaugh
Attorney, Agent, or Firm—Philip M. Rice; E. J. Holler

[57] ABSTRACT

This invention relates to a method for blow molding articles, such as handled containers, having injection molded portions integrally formed with blow molded portions. The method includes forming a tubular blowable parison, blowing this parison in a pre-form mold, and then blowing the pre-form to its final shape in a final blow mold. The utilization of the pre-form mold as an intermediate step makes possible the formation of containers of enhanced physical characteristics, the elimination of external flash or waste portions, and the formation of a final article having an injection molded portion integrated with a biaxially oriented blown portion.

The apparatus of the invention includes the means for forming the parison, the pre-form mold, the final blow mold and the means for correlating the operation of these portions of the apparatus to attain the operation of the overall method.

8 Claims, 17 Drawing Figures

METHOD FOR BLOW MOLDING PLASTIC ARTICLES

CROSS-REFERENCE TO RELATED APPLICATIONS

This is a division of application Ser. No. 143,802, filed May 17, 1971 and now U.S. Pat. No. 3,740,181.

BACKGROUND OF INVENTION

There has developed over the years, a class of blow molding machine known as the "inject, extrude and blow" machine, wherein the neck or finish of the container is injection molded in an injection mold superimposed on an annular orifice. After the mold is filled from the orifice, the mold is moved away from the orifice as a tube integral with the material filling the mold is extruded through the orifice. A blow mold is then closed on the tube between the neck mold and the orifice, pinching the tube shut near the orifice. Blow air is then injected through the neck mold into the tube, and the tube is simply inflated to the configuration of the blow mold. This type of machine is illustrated and described in detail in U.S. Pat. No. 3,008,192 to Allen et al.

In early attempts to adopt such injection, extrude and blow machines to the manufacture of handled jugs or the like, it was found impossible to extrude a tube having an integral injection finish and of sufficient diameter to provide material properly located in the parison to be pinched shut by the blow molds for forming an integral handle upon blowing. Attempts have been made to freely inflate or "puff" the tube to a diameter sufficient to provide an entrapped handle area but in the absence of precise control over the size of the tube, much "flash" or waste material was formed upon closing of the mold. Further, elaborate and expensive false finishes and funnels were injected, but again, excess flash was generated. Further, complicated and costly deflashing and finish facing machines were required, the amount of the scrap generated made the process economically unfeasible, and the severing of the scrap at the seams and edges of the bottles always generated the possibility of leakage in the final container. Finally, and most importantly, all of the advantages of a precisely formed, exactly dimensioned injection molded finish were lost by the various expedients which were developed in the art.

Additionally, it has been found that it is practically impossible to obtain the advantages of biaxial orientation in thermoplastic materials by attempting to inflate a relatively small diameter tube in one single blowing operation to a relatively large container, such as a handled jub. The material distribution inherent in the movement of the plastic material during blowing is such that all parts of the container would not be equally oriented, nor would the wall thicknesses throughout the container be uniform.

Thus, the prior systems, in addition to the practical difficulties outlined above, also suffer from the fact that the maximum potential of the thermoplastic material cannot be realized, because of the effective impossibility of biaxial orientation during forming of the container.

BRIEF DESCRIPTION OF THE INVENTION

So far as the initial formation of the tubular parison integral with the injection molded finish portion is concerned, the method of the present invention conforms substantially to that set forth in the above identified Allen et al patent.

However, once the initial tube has been formed, the present invention proposes the blow molding of the extruded tube or blowable portion of the parison within a "pre-form" mold. This mold interfits with the neck or finish mold, as proposed in the Allen et al patent, and this mold also pinches the tube shut in proximity to the orifice, as taught by Allen et al.

The configuration of the interior mold cavity of the pre-form mold, however, is intermediate the shape of the extruded tube and the shape of the final article to be formed. The pre-form mold cavity is of a configuration which more closely approaches the final article than does the tube as extruded, and particularly, in the manufacture of handled ware, the preformed mold cavity is of a configuration such that the pre-form formed therein will be encompassed within the handle-defining portions of the final blow mold. Other than the handle portion of the pre-form mold, the mold conforms generally to the shape of the final article, but is quite definitely undersized with respect to the final article. This undersizing, together with the temperature of the walls of the pre-form, is such that the blowing is carefully controlled, so that those conditions most conducive to biaxial orientation in the material will be obtained during the final blowing of the article.

Thus, it will be seen that by utilizing the intermediate or pre-form blow mold, it is possible to form a pre-form of a shape, size and temperature suitable for the manufacture of handled ware and having a fully injection molded finish. The problem of attempting to uniformly inflate a tubular parison of the size of the injected molded neck to the size of the finished handled container is avoided, the uncontrolled expansion of the extruded parison when puffing or attempted blowing without enclosing mold is also avoided, no flash is formed at the exterior of the container because the size and shape of the pre-form can be accurately controlled, and the possibility of leaks occurring during exterior flash removal is also avoided. Most importantly, it is possible to cool the pre-form to a desired degree so that effective biaxial orientation is obtained when the pre-form is blown to its final configuration.

The appratus for carrying out this method amounts to an adaption of the conventional inject, extrude and blow mechanism. A neck mold is filled with material at injection pressures at the orifice, and the neck mold is then withdrawn from the orifice as the initial tubular parison is extruded. The neck mold is halted in spaced relation to the orifice with the tubular parison remaining connected to both the neck mold and to the orifice. Next, the pre-blow mold is closed on the tube, this mold pinching the tube shut adjacent the orifice to form a blowable bubble, which bubble is blown to the configuration of the preblow mold cavity by air injected through the neck mold.

After pre-blowing and the attainment of the desired orienting temperature in the walls of the pre-form, the pre-blow mold is opened and moved away from the blown pre-form. The blown pre-form is stabilized in position by its suspension between the still-closed neck mold and the orifice to which it is still attached by the pinched-shut "tail" of the pre-form. Next, the final blow mold is closed on the pre-form and the pre-form is blown to its final configuration.

The temperatures to be attained in the walls of the pre-form, the desired blow-up ratios, and the thermoplastic materials which exhibit biaxial orientation are all set forth in my co-pending application Ser. No. 103,624, filed Jan. 4, 1971 and now U.S. Pat. No. 3,767,747.

Thus, it will be seen that the present invention results in a bottle of enhanced physical characteristics, since the bottle is made up of material which is biaxially oriented, there is no exterior flash which must be removed, and there are no seams raising the possibility of leaks when this flash is removed. Further, the bottle is of increased uniformity and structural integrity, particularly in the finish or neck region which can always be injected to its final form without deflashing, finish facing, or the like. Additionally, there is no substantial scrap loss, so there is less regrind material included in the material being processed and there is substantially less possibility of thermal degredation in this regrind material when polyvinyl chloride, and similar heat sensitive materials are utilized.

It is, therefore, an important object of the present invention to provide a new and improved method of making containers or the like wherein a tubular parison integral with an injection molded neck is subject to consecutive pre-blowing and final blowing operations to obtain a container of enhanced physical characteristics of enhanced leak-proof capability, and with substantially less loss of material to flash or other waste portions subsequently trimmed from the finished container.

Another important object of the present invention is the provision of the method of blow molding a container or the like having an injection molded finish portion and a blow molded body portion provided with an integrally formed blown handle, by injection molding the finish portion, extruding a tubular parison, pre-blowing the tubular parison in a pre-blow mold to a configuration sufficient to at least partially emcompass the area forming the handle in the final container, and then finally blowing the pre-blow shape to its final configuration, including the handle, without forming any exterior flash at either the finish or the handle portions of the container.

It is a further object of this invention to provide an improved method employing apparatus for the manufacture of blown plastic articles provided with an injection molded portions and including means for injecting the one portion of the article, means for extruding a blowable tubular parison integral with the injected molded portion, a first blow mold within which the tube is blown to a configuration intermediate the configuration of the tube and the configuration of the final article, and a final blow mold in which the intermediate shape is inflated to the final configuration.

Yet another, and no less important, object of this invention is the provision of a method of making a container provided with an integral handle which is blown under conditions such that the blown portions of the container are substantially uniformly biaxially oriented, the method including the steps of blowing the article from a tubular parison in two successive blowing steps, the handle region of the container being encompassed with the first blown shape, and the handle area being blown to its final configuration during the second blowing step without the formation of any exterior flash or waste material.

Other and further objects and advantages of this invention will become apparent upon reading the following description, of which the attached drawings form a part.

Figure 1:
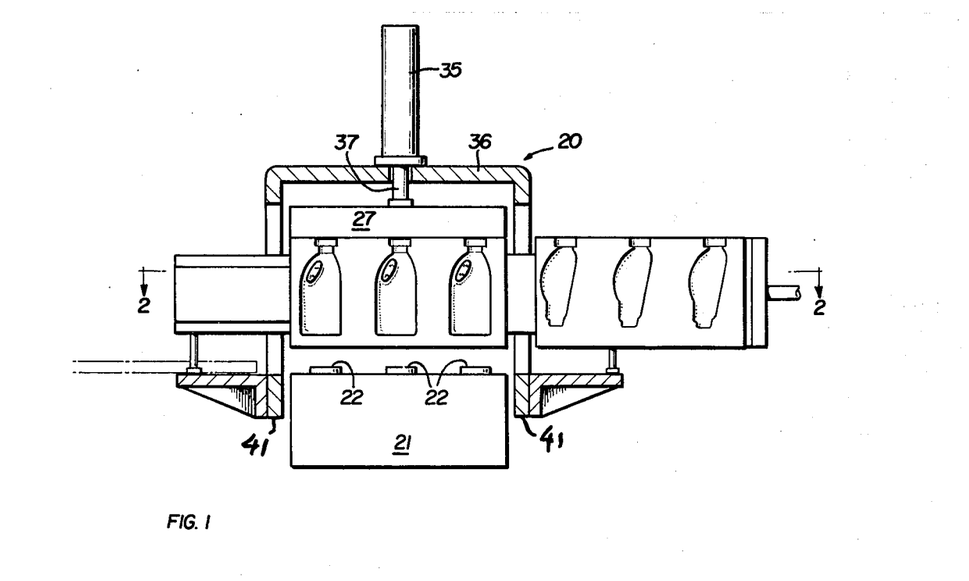
FIG. 1 is a side elevational view of an apparatus of the present invention capable of carrying out the method of the present invention.

Referring to the drawings, in FIG. 1, reference numeral 20 refers generally to an "inject, extrude and blow" machine which is quite similar in its overall functions to that machine described in U.S. Pat. No. 3,008,192.

Figure 8:
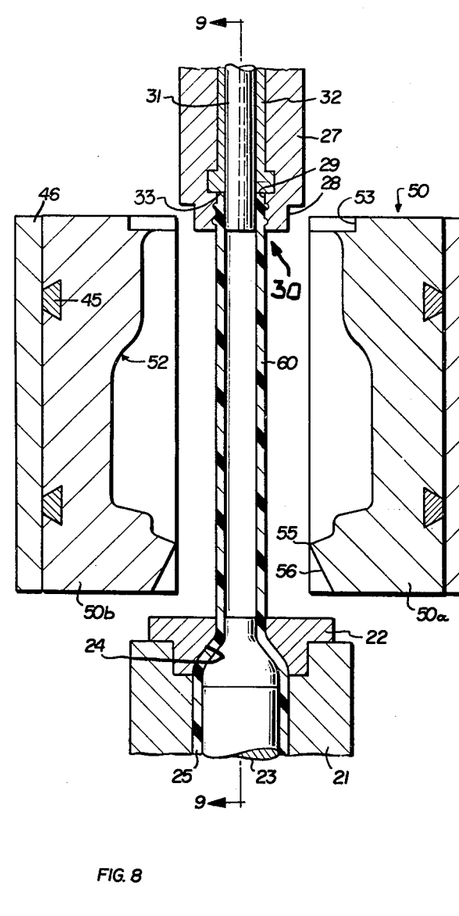
FIG. 8 is an enlarged vertical sectional view illustrating the formation of the initial tubular parison.
Figure 9:
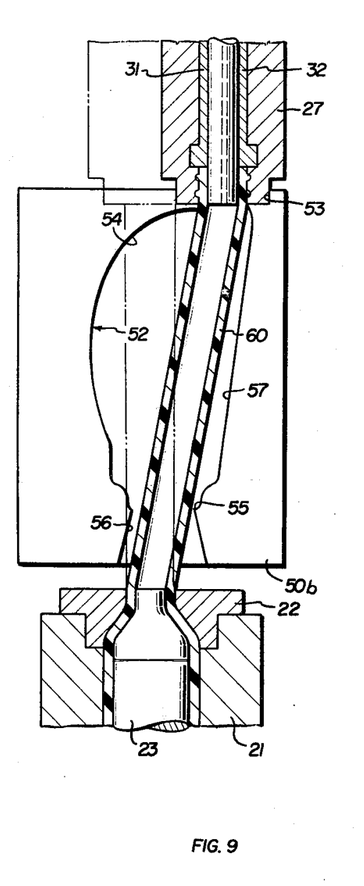
FIG. 9 is a sectional view, with parts shown in elevation, taken along the plane 9—9 of FIG. 8.

Generally, this machine includes a lower orifice block 21 having a plurality of channels therein connected to an extruder or other suitable source of plasticized plastic material (not shown), the block 21 providing for the flow of plasticized material to a series of annular orifice plates 22, best shown in FIGS. 8 and 9. The orifice plates 22 cooperate with central upstanding orifice mandrels 23 to define a series of annular orifices 24 therebetween, each orifice 24 opening upwardly and communicating through annular material channels 25 with the extruder for the supply of material thereto.

Superimposed over the orifice block 21 and vertically aligned therewith is a neck mold block 27 having a plurality of lower reduced diameter portions 28 circumscribing individual interior neck mold cavities 30 defined between interior bores 29 of the block 27 and central blow pins 31 projecting vertically through the bores 29, respectively. A split sleeve 32 is interposed between each pin 31 and bore 29 to provide an undersurface 33 blocking off the upper portion of the bore 29, the surface 33 serving to define the upper end of each injection chamber 30. Neck mold block 27 is vertically actuated toward and away from the orifice block 21 by an upper actuating cylinder 35 carried on a mounting yoke 36, the cylinder actuating rod 37 projecting through the yoke and being attached to the neck head 27.

Figure 2:
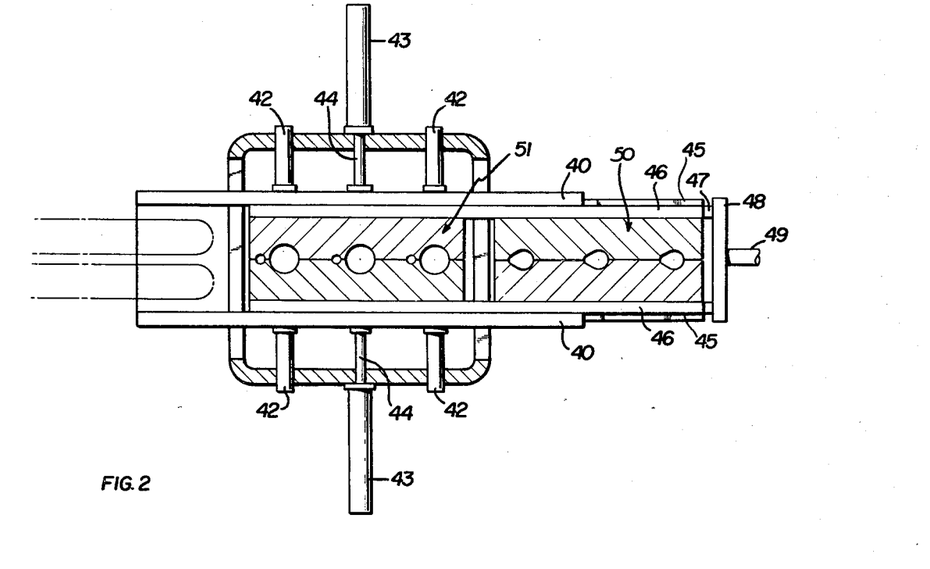
FIG. 2 is a sectional view with parts shown in elevation, taken along the plane 2—2 of FIG. 1.
Figures 3, 4, 5:
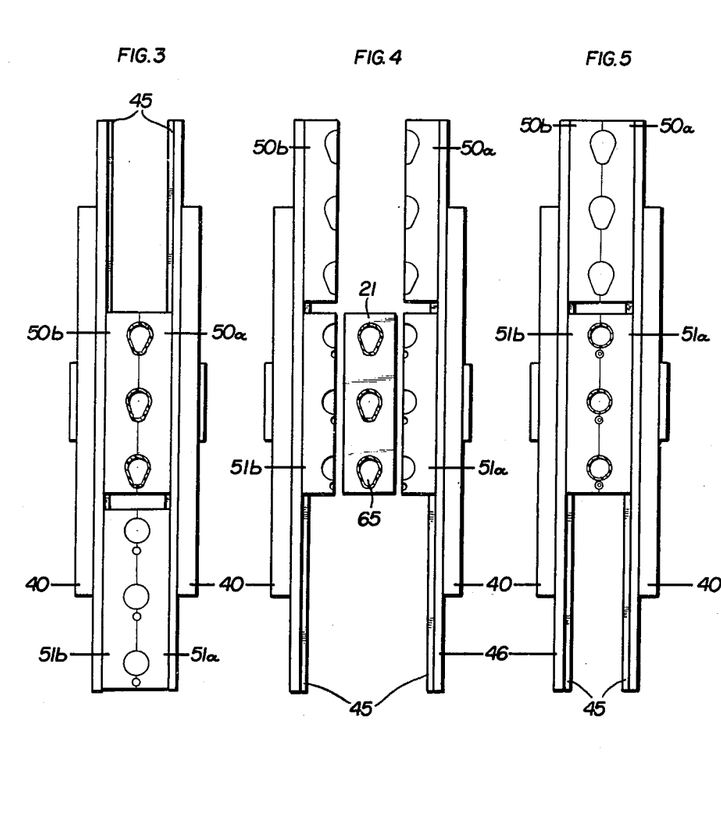
FIGS. 3 through 7 are diagramatic views similar to FIG. 2 illustrating the consecutive forming operations carried out by the apparatus and forming the method, these views particularly illustrating the movement of the pre-form and final blow molds.
Figures 6, 7:
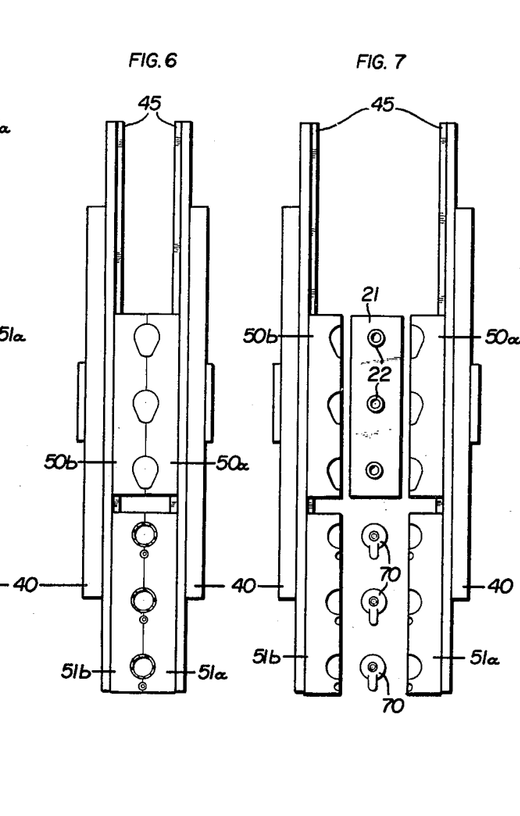

A pair of spaced mold side mounting plates 40 are carried by support legs 41 of the mounting yoke 36, these plates being equipped with guide bearings 42 for transverse movement toward and away from one another. Upon actuation of actuating cylinder 43 mounted on the support legs 41, the actuating rods 44 (extending through the legs 41 and attached to the mold plates 40) move the side plates 40 toward and away from one another. These mold side plates 40 are provided with longitudinally extending keys or guides 45 (FIG. 2).

Mounted on the guides 45 for sliding movement thereof are two separate sets of blow molds indicated generally at 50 and 51, respectively. These blow molds are similar but smaller in overall external shape and are mounted upon transversely spaced, common mounting plates 46 in fixed, spaced relationship. These mounting plates 46 contact the guides 45 and slide along the guides intermediate the side mounting plates 40. The mold mounting plates 46 project beyond the confines of the mold 50,51, as at 47, and these projecting portions 47 are mounted for transverse sliding movement on an actuating plate 48. The plate 48 is secured to the actuating piston rod 49 of an elongated actuating cylinder (not shown) having a stroke sufficient to interpose either of the mold assemblies 50, 51, between the lower orifice block 21 and the upper neck ring block 27. The extent of movement of the mold sections between the blocks 21, 27 and the correlated opening and closing of the mold sections 50, 51 is well illustrated schematically in FIGS. 3 through 7.

As best shown in FIGS. 8 through 12, the mold assembly 50 comprises a series of mold halves 50a, 50b which cooperate to define an interior mold cavity 52. This mold cavity 52 is of a shape intermediate that of the extruded tube or initial parison and that of the final blow molded container, as will be hereafter more fully described. Generally, the mold cavity 52 includes an upper recess 53 adapted to receive the lower reduced portion 28 of the neck mold block 27, a laterally enlarged handle-encompassing portion 54, a lower pinch-off projection 55 and a flared tail-confining portion 56 therebeneath. An inclined, generally linear body-defining portion is also provided at 57 opposite to the portion 54.

In operation, the neck mold block 27 is initially lowered by means of its cylinder 35 into contact with the orifice plate 22, and plastic material is injected from the orifice 24 into the neck mold 30 to fill the neck mold cavity.

After the material in the neck mold cavity has been solidified to a self-sustaining state, the cylinder 35 is actuated and the neck mold is retracted vertically upwardly to its position illustrated in FIG. 8, while additional material is issued from the orifice 24 to form the extruded tube or initial parison 60. Preferably, the initial movement of the neck mold block 27 is truly vertical, but where desired, this motion may be upwardly and laterally in an angular direction. Alternatively, the neck mold 27 may be displaced after the full extent of its vertical motion has been accomplished, so that the neck mold is no longer aligned with the orifice. This neck mold actuation is described in detail in U.S. Pat. No. 3,122,596.

Figure 10:
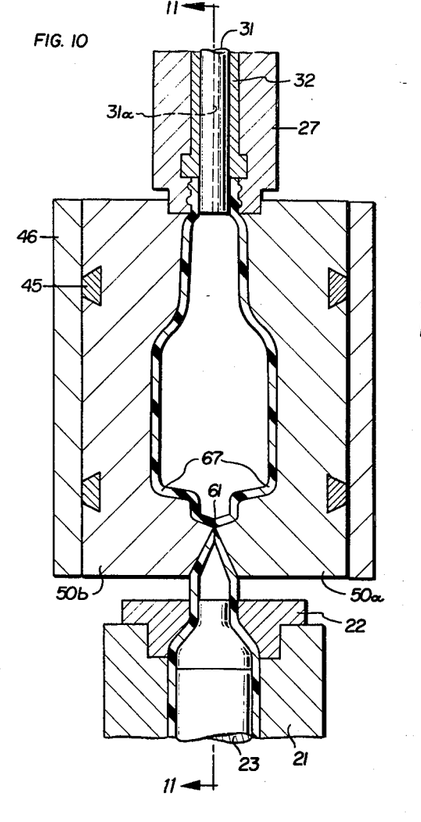
FIG. 10 is a view similar to FIG. 8, but with the pre-form molds closed and the pre-form inflated.
Figure 11:
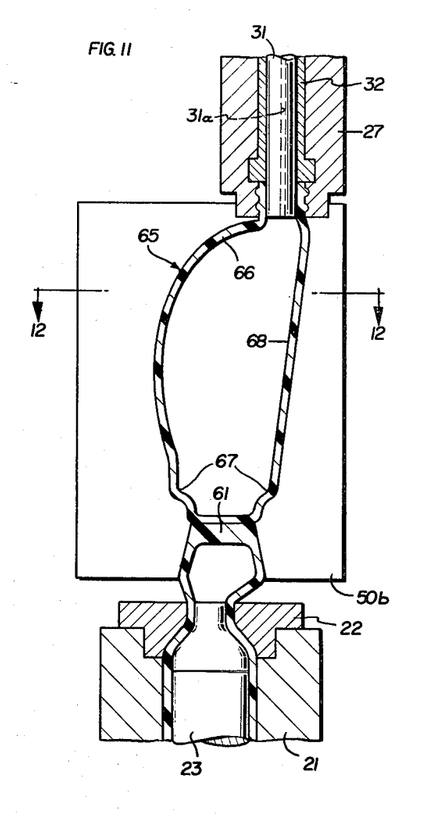
FIG. 11 is sectional view taken along the plane 11—11 of FIG. 10.

Next, the tubular extrusion 60 is entrapped in the mold sections 50a and 50b by closure of the mold sections upon actuation of the cylinder 43, this motion being guided by the guides 42. The closure of the mold sections 50a, 50b, pinches the tube shut by engagement of the pinching projection 55 with the tube in close proximity to the orifice 24. This area of pinch-off is illustrated in FIGS. 10 and 11 of the drawings at 61. Once the tube has been pinched shut, the tube 60 now becomes a blowable bubble and upon introduction of air through the air passage 31a in the neck pin 31, the blowable bubble or parison is inflated to the configuration of the mold cavity 52.

Figure 14:
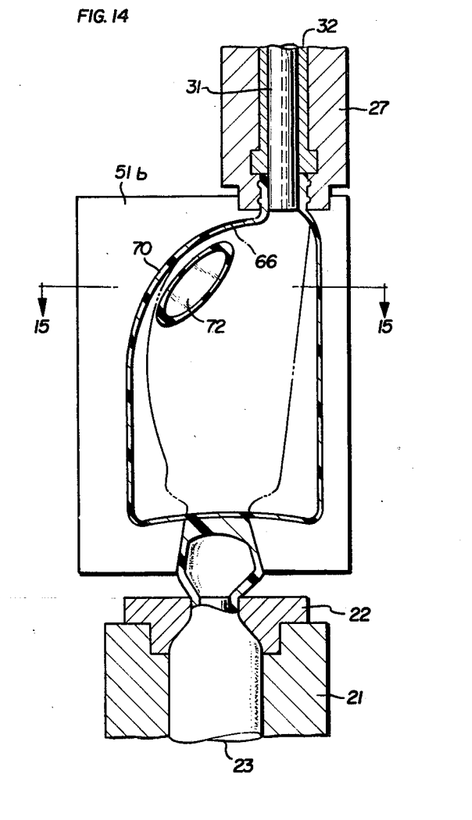
FIG. 14 is a sectional view taken along the plane 14—14 of FIG. 13.

From FIGS. 10 and 11 it will be seen that the blown "pre-form," indicated generally at 65, is provided (1) with somewhat bulbous enlarged area 66, the location generally conforming to the location of the handle in the final container (compare FIGS. 11 and 14), (2) with lower corner portions 67 conforming to the four bottom corners of "heel" portions of the final container, and (3) with a generally vertically extending linear portion 68 which conforms to the substantially straight non-handled side of the final bottle of FIG. 14.

Figure 12:
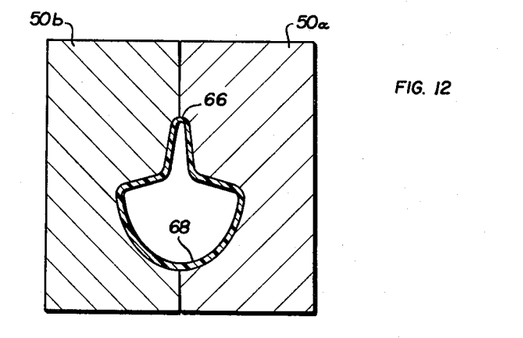
FIG. 12 is a sectional view taken along the plane 12—12 of FIG. 11.
Figure 13:
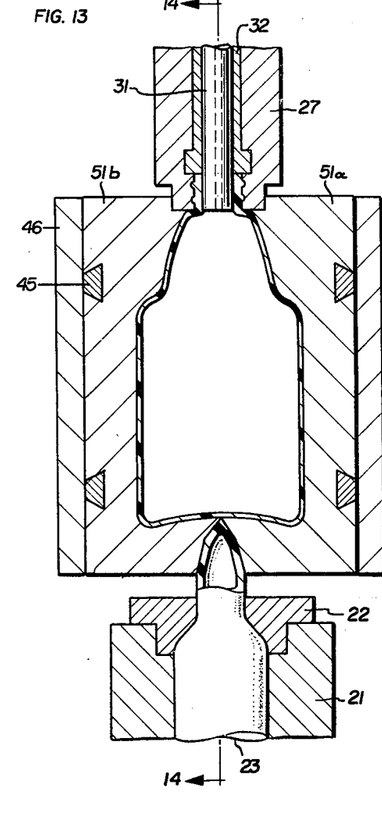
FIG. 13 is a view similar to FIGS. 9 and 11 but illustrating the final blow molds and the pre-form inflated interiorally of the blow molds.

From FIG. 12 it will be seen that the handle-defining portion 66 forms a projection of restricted width which is laterally displaced from the main body defining portions of the remainder of the pre-form.

After inflation of the pre-form to the configuration shown in FIGS. 10 through 12, the mold sections 50,51 are opened by means of the side cylinders 43, leaving the pre-form held in position by the neck (still retained within the confines of the neck mold) and by means of the pinched area 61 (still connected to the orifice 24). The molds then are longitudinally displaced by means of the piston rod 45 and its associated cylinder, to the position of FIG. 2, at which the final blow mold 50 is now laterally aligned with the pre-form. Next, the mold sections are closed by the cylinders 43, and air is introduced through the pin opening 31a to inflate the container to its final configuration interiorly of the final blow mold sections 51a, 51b.

Figure 15:
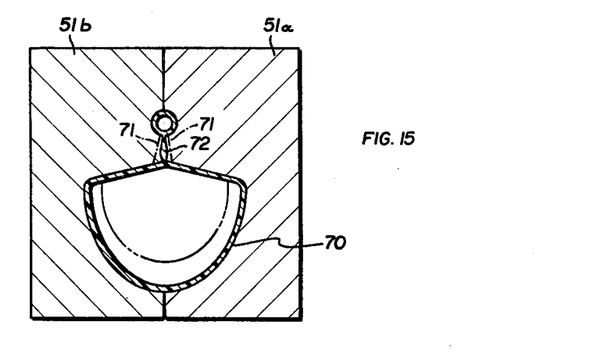
FIG. 15 is a sectional view taken along the plane 15—15 of FIG. 14.

From the overlay of the pre-form (indicated in dotted outline) on the final bottle (indicated in solid outline) in FIG. 14, it will be seen that the bulbous projection 66 projects outward into that portion of a final blow mold sections 51a and 51b which form the handle 70 of the final article. The same relative pre-form-final article configuration is illustrated in FIG. 15 of the drawings wherein again the shape of the pre-form is overlaid in dotted outline of the solid outline of the final container. The mold cavity interiorly of the blow molds 51a and 51b contain projecting portions 71 which are closely spaced to mash flat that portion of the jug handle which will be removed to form the handle hand hole of the final container, this portion being indicated at 72. It is necessary that the pre-form portion 66 extend beyond the mashed portion 71 in order that the final handle configuration can be blown.

Additionally, it will be noted that those portions defining the corners 67 of the pre-form have been displaced downwardly and outwardly to the "heels" of the container, and the additional material which has been gathered by the "folded" configurations of the corners 67 and the pinch line 61 forms the bottom and corners of the container, so as to form all portions of the container to substantially the same wall thickness.

By the proper design of the pre-blown parison or "pre-form" 65, the walls of this pre-blown shape are inflated and distended substantially uniformly during the final blowing operation. Further, the pre-form is retained in the closed pre-form mold sections 50a and 50b until such time as the average wall temperature of the pre-blown shape attains the temperature most condusive to orientation. By the twin factors of temperature control and uniform blowing, excellent and uniform biaxial orientation can be obtained in the blown portions of the final article. The temperature conditions necessary for effective orientation utilizing different types of materials are to be found in my copending application Ser. No. 103,624, filed Jan. 4, 1971 now U.S. Pat. No. 3,767,747.

Figure 16:
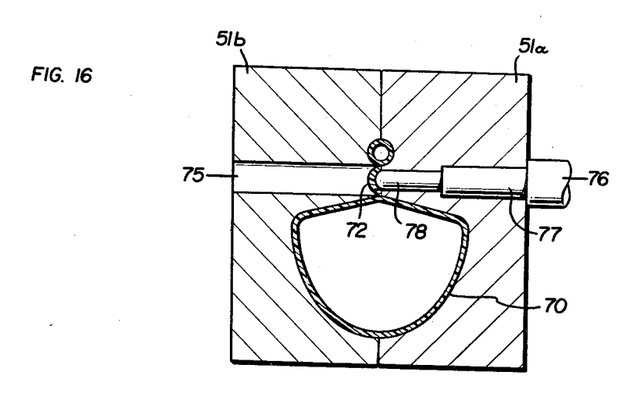
FIGS. 16 and 17 are sectional views similar to FIG. 15 but illustrating a modification of the invention wherein the interior flash formed during blowing of the handle is removed.
Figure 17:
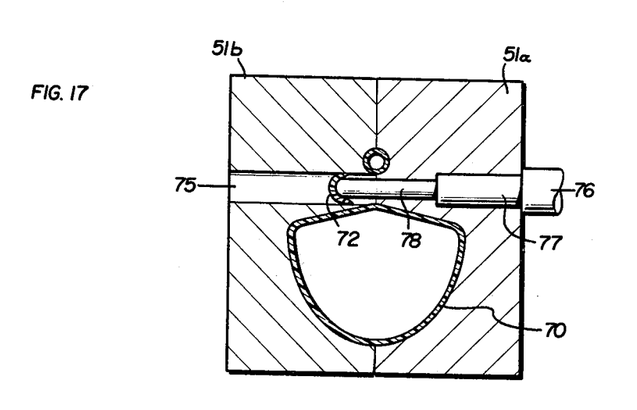

Of course, that material located at 72 and mashed between the handle-defining porjections 71 of the mold 51 forms flash or waste material which must be removed. Such material can either be removed in a post-molding operation or by means of a mechanism illustrated in FIGS. 16 and 17. The mold section 51b is provided with a passage 75 aligned with the flash 72 and of the same general configuration as the flash. Mold section 51A carries an exterior mounted actuating rod 76 having a guide projection 77 located interiorly of the mold section and a movable piston rod 78 aligned with the passage 75 and forming a portion of the side wall at which the flash 72 is to be formed. Upon closure of the mold walls, the portions surrounding the passage 75, in cooperation with those portions of the mold section 51A surrounding the movable piston rod 78 engage and at least partially sever the flash. Following the molding operation, the cylinder 76 is actuated to project the piston rod 78 into the recess 75 carrying with it the previously formed flash 72. In this way, a completely flash-free bottle is made, with the exception of the lower "tail" formed beneath the pinched-off portion 61 still connecting the blown bottle to the orifice. This removal of the flash 72 is disclosed in U.S. Pat. No. 3,362,043.

To remove the bottle from the apparatus, it is only necessary to open the neck mold and to rupture the molten material in the orifice from the tail portion 61 of the finished container. This can be done in several different ways with various take-out mechanisms which have been proposed in the prior art.

Having fully described an operative embodiment of this invention, I now claim:

1. In a method of making a blow molded container having an injection molded finish portion and a blown body portion having a handle, the steps of:

positioning an injection finish mold in direct communication with an annular extrusion orifice, filling said injection finish mold with thermoplastic material from said orifice, simultaneously moving said finish mold from said orifice and extruding a tube from said orifice integral with thermoplastic material in said mold, the improvements of closing a pre-form mold having an internal cavity on said extruded tube to thereby create a tail portion of said tube, radially distending said tube to a pre-form configuration conforming to the shape of the internal cavity of said pre-form mold, wherein said pre-form includes an enlarged bulbous region destined to form the handle of said blown container body, opening said pre-form mold, relatively moving the blown pre-form and said pre-form mold to expose the blown pre-form, closng a final blow mold onto said pre-form, said final blow mold having a cavity conforming to the shape of the container and a handle defining portion, engaging said pre-form during the closing step only at the enlarged bulbous region by said handle defining portion and at said tail, and radially distending said pre-form to the shape of said blown container.

2. The method of claim 1, wherein the pre-form is blown to its final configuration while at an average wall temperature conducive to orientation.

3. The method of claim 1, wherein the pre-form after blowing remains attached to the finish mold and to the extrusion orifice during relative movement of the pre-form and the pre-form mold, closing of the final blow mold and radial distending of the pre-form in the final blow mold.

4. The method of claim 3, wherein the finish mold is elevated from the extrusion orifice during the extrusion of the tube and the vertical extent of the pre-form is substantially the same as that of the final blown article, but the volume of the pre-form is substantially less than that of the final blown article.

5. The method of claim 1, wherein the pre-form mold and the final blow mold are jointly displacable in a plane normal to the direction of movement of the finish mold from the orifice for successive alignment with an extruded tube and a pre-form, respectively.

6. The method of claim 5, wherein a plurality of tubes are formed between separate injection molds and orifices, respectively, the tubes being aligned in the direction of movement of the molds, and separate mold cavities are provided for the separate tubes, respectively.

7. In a method of reducing scrap and flash in the formation of a container having a seamless blown container body with an asymmetric configuration and an injection molded finish integral with said body, the method including:
  1. closing the sections of a sectional pre-form mold onto a thermoplastic parison having an injection molded finish, and forming a tail portion on said parison, said pre-form mold sections, when closed, defining a first mold cavity;
  2. expanding the parison within said first mold cavity to the configuration of a blowable pre-form body having a shape and size intermediate the shape and size of the parison and the container, said pre-form body including an enlarged bulbous region destined to form a portion of the asymmetric configuration of said container;
  3. removing the pre-form from the first mold cavity and positioning the pre-form between the sections of a sectional final mold which, when closed, defines a second mold cavity larger than said first mold cavity and conforming to the shape of the blow container body;
  4. closing said mold sections to engage the tail portion projecting outside of the mold cavity, the remainder of the pre-form body being confined within the second mold cavity to reduce the formation of flash and scrap material; and
  5. expanding said pre-form to the shape of said second mold cavity.

8. The method as defined in claim 7, characterized in Step (3) by forming concave heels on said pre-form and in Step (6) by expanding the concave heels to form convex heels on the blown container.

* * * * *